United States Patent
Xu et al.

(10) Patent No.: US 10,560,837 B2
(45) Date of Patent: Feb. 11, 2020

(54) METHOD AND APPARATUS FOR SUPPORTING STANDALONE LOCAL GATEWAY SERVICE FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/538,627

(22) PCT Filed: Jan. 14, 2016

(86) PCT No.: PCT/KR2016/000416
§ 371 (c)(1),
(2) Date: Jun. 21, 2017

(87) PCT Pub. No.: WO2016/114612
PCT Pub. Date: Jul. 21, 2016

(65) Prior Publication Data
US 2018/0007536 A1   Jan. 4, 2018

Related U.S. Application Data

(60) Provisional application No. 62/204,462, filed on Aug. 13, 2015, provisional application No. 62/104,045, filed on Jan. 15, 2015.

(51) Int. Cl.
H04W 36/00 (2009.01)
H04W 8/08 (2009.01)
(Continued)

(52) U.S. Cl.
CPC ........... *H04W 8/082* (2013.01); *H04W 24/02* (2013.01); *H04W 36/0016* (2013.01);
(Continued)

(58) Field of Classification Search
None
See application file for complete search history.

(56) References Cited

U.S. PATENT DOCUMENTS

| | | | |
|---|---|---|---|
| 2013/0003697 A1* | 1/2013 | Adjakple | H04W 36/0011 370/331 |
| 2013/0003699 A1* | 1/2013 | Liu | H04W 8/082 370/331 |

(Continued)

FOREIGN PATENT DOCUMENTS

| | | |
|---|---|---|
| CN | 102209398 | 10/2011 |
| CN | 102869122 | 1/2013 |

(Continued)

OTHER PUBLICATIONS

PCT International Application No. PCT/KR2016/000416, Written Opinion of the International Searching Authority dated Apr. 12, 2016, 2 pages.
(Continued)

*Primary Examiner* — Gregory B Sefcheck
*Assistant Examiner* — Jenkey Van
(74) *Attorney, Agent, or Firm* — Lee Hong Degerman Kang Waimey

(57) ABSTRACT

A method and apparatus for transmitting a local home network identity (LHN ID) in a wireless communication system is provided. A first evolved NodeB (eNB) transmits an X2 Setup Request message including a LHN ID of the first eNB to a second eNB, and receives an X2 Setup Response message including a LHN ID of the second eNB from the second eNB. The first eNB may determine whether (Continued)

or not to trigger a secondary eNB (SeNB) addition procedure according to the LHN ID of the second eNB. When it is determined that the LHN ID of the second eNB is the same as the LHN ID of the first eNB, the first eNB may trigger the SeNB addition procedure.

2 Claims, 19 Drawing Sheets

(51) Int. Cl.
| | | |
|---|---|---|
| *H04W 84/04* | (2009.01) | |
| *H04W 24/02* | (2009.01) | |
| *H04W 76/15* | (2018.01) | |
| *H04W 92/20* | (2009.01) | |
| *H04W 36/12* | (2009.01) | |

(52) U.S. Cl.
CPC ....... *H04W 36/0077* (2013.01); *H04W 76/15* (2018.02); *H04W 84/045* (2013.01); *H04W 36/0069* (2018.08); *H04W 36/125* (2018.08); *H04W 92/20* (2013.01)

(56) References Cited

U.S. PATENT DOCUMENTS

| | | | | |
|---|---|---|---|---|
| 2013/0010754 A1* | 1/2013 | Xu | ........................ | H04W 76/30 370/331 |
| 2014/0376512 A1* | 12/2014 | Jeong | ................ | H04W 36/0016 370/331 |
| 2015/0043531 A1* | 2/2015 | Masini | .................. | H04L 47/805 370/331 |
| 2015/0139086 A1* | 5/2015 | Murakami | .............. | H04W 8/26 370/329 |
| 2015/0146690 A1* | 5/2015 | Liang | .................... | H04W 36/12 370/331 |
| 2015/0173047 A1* | 6/2015 | Yamada | .............. | H04W 72/042 370/329 |
| 2016/0174285 A1* | 6/2016 | Ke | .......................... | H04W 8/06 370/329 |
| 2016/0183127 A1* | 6/2016 | Xu | ........................ | H04W 16/08 370/235 |
| 2016/0323926 A1* | 11/2016 | Gao | ........................ | H04W 76/10 |
| 2016/0373987 A1* | 12/2016 | Ahmad | ................. | H04W 36/22 |
| 2018/0007591 A1* | 1/2018 | Xu | .................... | H04W 36/0055 |

FOREIGN PATENT DOCUMENTS

| | | |
|---|---|---|
| CN | 103139911 | 6/2013 |
| KR | 1020130035987 | 4/2013 |

OTHER PUBLICATIONS

3rd Generation Partnership Project (3GPP), "Technical Specification Group Radio Access Network; Evolved Universal Terrestrial Radio Access Network(E-UTRAN); X2 application protocol (X2AP)(Release 12)" 3GPP TS 36.423 V124.2, Dec. 2014, 206 pages.
ETSI TS 129 303 V124.0, "Universal Mobile Telecommunications System (UMTS); LTE; Domain Name System Procedures; Stage 3" (3GPP TS 29.303 version 12.4.0 Release 12), Oct. 2014, 68 pages.
Catt, "Using the LHN id for connected mode mobility procedures," SA WG2 Meeting #86, S2-113346, Jul. 2011, 5 pages.
Samsung, "Resolve the open issues for SIPTO@LN," SA WG2 Meeting #94, S2-124290, Nov. 2012, 7 pages.
European Patent Office Application Serial No. 16737576.5, Search Report dated May 17, 2018, 18 pages.
Korean Intellectual Property Office Application No. 10-2017-7020453, Office Action dated Jun. 12, 2018, 7 pages.
Samsung, "SIPTO@LN with a standalone L-GW", 3GPP TSG RAN WG3 Meeting #80, R3-131032, May 2013, 5 pages.
Huawei, "Consideration on SGW relocation", 3GPP TSG RAN WG3 Meeting #85, R3-141619, Aug. 2014, 3 pages.
Samsung, "LIPA/SIPTO support in the small cell", 3GPP TSG RAN WG3 Meeting #81, R3-131440, Aug. 2013, 2 pages.
Ericsson, "Signalling procedures for dual connectivity", 3GPP TSG RAN WG2 Meeting #84, R2-134219, Nov. 2013, 9 pages.
Ericsson, "Introduction of SIPTO@LN Stand-Alone in LTE Stage 2", 3GPP TSG RAN WG2 Meeting #84, R2-134552, Nov. 2013, 12 pages.
Huawei, "Discussion on the enhancement for SIPTO in DC", 3GPP TSG RAN WG3 Meeting #87, R3-150067, Feb. 2015, 6 pages.
LG Electronics, "Consideration on SIPTO for Dual Connectivity", 3GPP TSG RAN WG3 Meeting #87, R3-150264, Feb. 2015, 5 pages.
ZTE, "Motivation for Dual connectivity enhancements", 3GPP TSG RAN Meeting #65, RP-141471, Sep. 2014, 5 pages.
Alcatel-Lucent, et al., "LIPA/SIPTO Support in dual connectivity (SA2 point 9)", 3GPP TSG RAN WG3 Meeting #83, R3-140256, Feb. 2014, 5 pages.
Korean Intellectual Property Office Application No. 10-2017-7020453, Final Office Action dated Jan. 28, 2019, 5 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.4.0, Dec. 2014, 251 pages.
Alcatel-Lucent, Alcatel-Lucent Shanghai Bell, "New Path Switch procedure for Dual Connectivity", R3-140775, 3GPP TSG-RAN WG3 Meeting #83bis, Apr. 2014, 5 pages.
The State Intellectual Property Office of the People's Republic of China Application Serial No. 201680005486.5, Office Action dated Oct. 11, 2019, 7 pages.

* cited by examiner

US 10,560,837 B2

METHOD AND APPARATUS FOR SUPPORTING STANDALONE LOCAL GATEWAY SERVICE FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2016/000416, filed on Jan. 14, 2016, which claims the benefit of U.S. Provisional Application Nos. 62/104,045, filed on Jan. 15, 2015 and 62/204,462, filed on Aug. 13, 2015, the contents of which are all hereby incorporated by reference herein in their entirety.

BACKGROUND OF THE INVENTION

Field of the Invention

The present invention relates to wireless communications, and more particularly, to a method and apparatus for supporting a standalone local gateway (L-GW) service for dual connectivity in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

The LTE network architecture is designed for the centralized gateways where the operator typically only has one or a few gateways. That architecture makes sense for the Internet access because the number of Internet peering points is limited. Different architecture, however, may be needed for the small base stations to allow access to the local content. The local access would be practical for accessing corporate intranet information or accessing a home network over LTE radio.

A local home network (LHN) means a set of (H)eNBs and local gateways (L-GWs) in the standalone GW architecture, where the (H)eNBs have Internet protocol (IP) connectivity for selected IP traffic offload (SIPTO) at the local network (SIPTO@LN) via all the L-GWs.

When dual connectivity is supported for the SIPTO@LN, a few problems may happen, which needs to be required to be addressed.

SUMMARY OF THE INVENTION

The present invention provides a method and apparatus for supporting a standalone local gateway (L-GW) service for dual connectivity in a wireless communication system. The present invention provides a method and apparatus for how a master evolved NodeB (MeNB) in dual connectivity knows a local home network identity (LHN ID) of a secondary eNB (SeNB) in dual connectivity or indication of L-GW support.

In an aspect, a method for transmitting, by a first evolved NodeB (eNB), a local home network identity (LHN ID) in a wireless communication system is provided. The method includes transmitting an X2 Setup Request message including a LHN ID of the first eNB to a second eNB, and receiving an X2 Setup Response message including a LHN ID of the second eNB from the second eNB.

The LHN ID of the first eNB may be the same as the LHN ID of the second eNB.

The first eNB may be a master eNB (MeNB) in dual connectivity, and the second eNB may be a secondary eNB (SeNB) in dual connectivity. Or, the first eNB may be a SeNB in dual connectivity, and the second eNB may be a MeNB in dual connectivity.

The LHN ID of the first eNB may identify a local home network to which the first eNB belongs. The LHN ID of the second eNB may identify a local home network to which the second eNB belongs.

The first eNB may be connected to a stand-alone local gateway (L-GW) corresponding to a local network. The stand-alone L-GW may be collocated with a first serving gateway (S-GW) other than a second S-GW corresponding to an operator's generic network.

In another aspect, a method for receiving, by a first evolved NodeB (MeNB), a local home network identity (LHN ID) in a wireless communication system is provided. The method includes receiving an LHN ID of a second eNB from the second eNB, and determining whether or not to trigger a secondary eNB (SeNB) addition procedure according to the LHN ID of the second eNB.

The method may further include triggering the SeNB addition procedure when it is determined that the LHN ID of the second eNB is the same as a LHN ID of the first eNB.

The LHN ID of the second eNB may be received via an X2 Setup Request message or an X2 Setup Response message.

The method may further include transmitting a LHN ID of the first eNB to the second eNB. The LHN ID of the first eNB may be transmitted via an X2 Setup Request message or an X2 Setup Response message.

When dual connectivity is introduced for SIPTO@LN, the MeNB can know the LHN ID of the SeNB efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
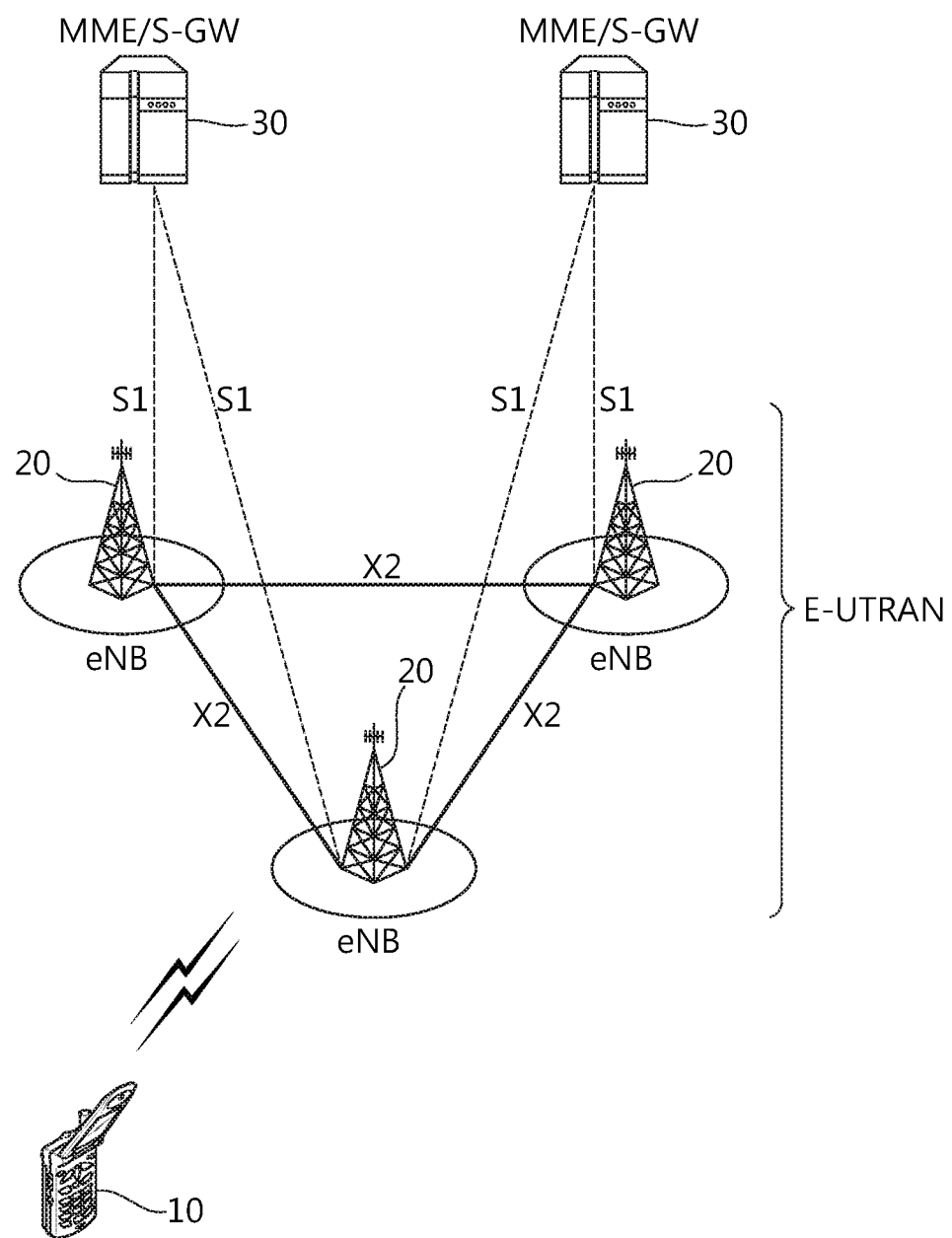
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
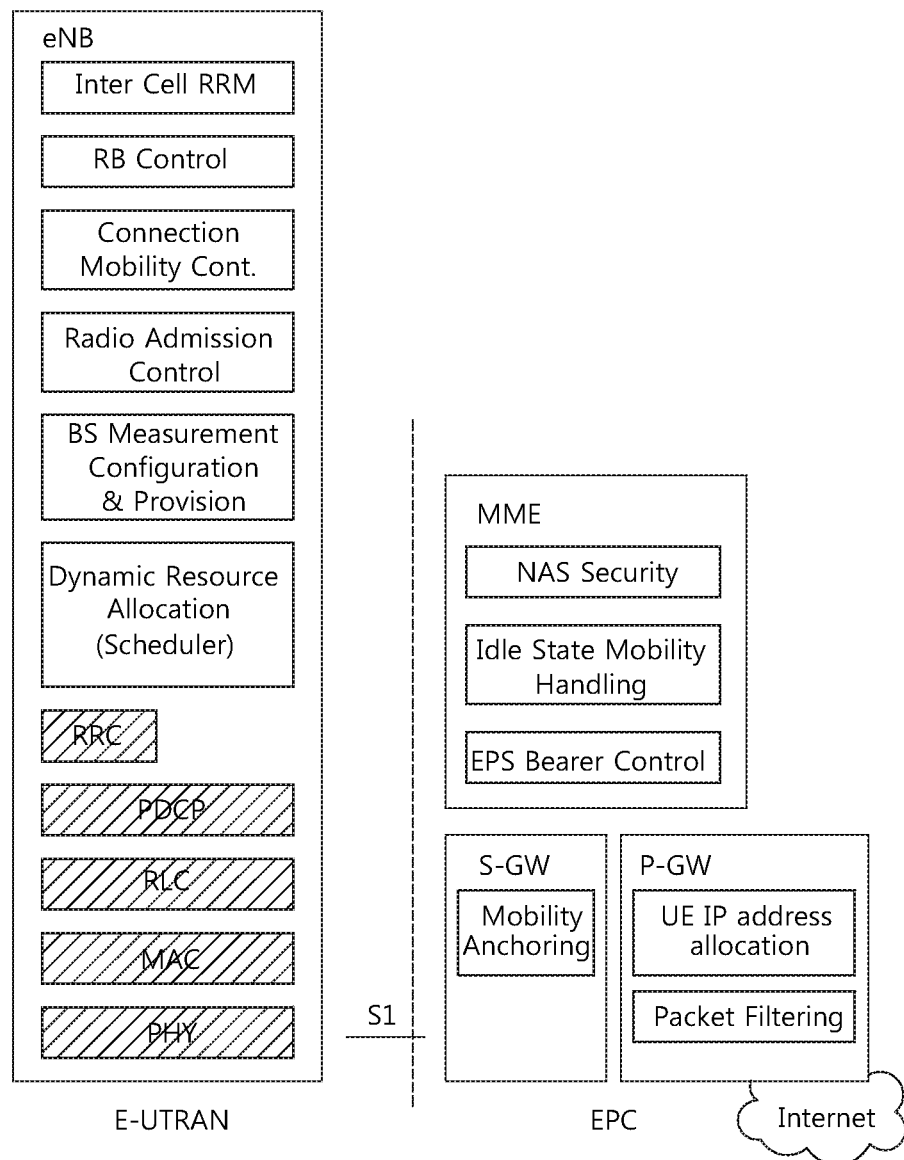
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
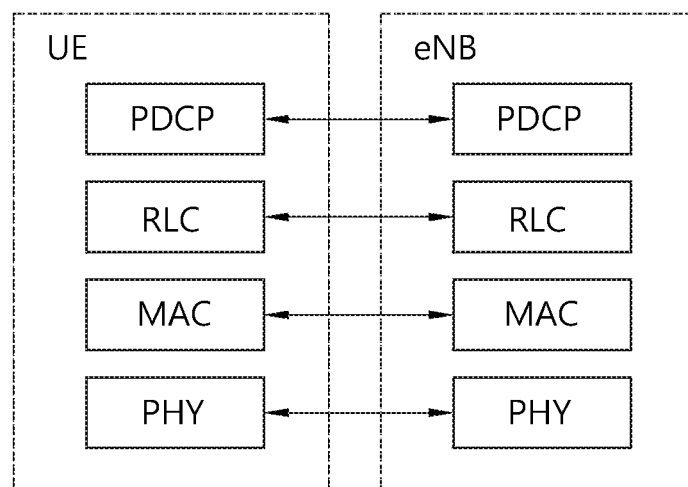
FIG. 3 shows a block diagram of a user plane protocol stack of an LTE system.
Figure 4:
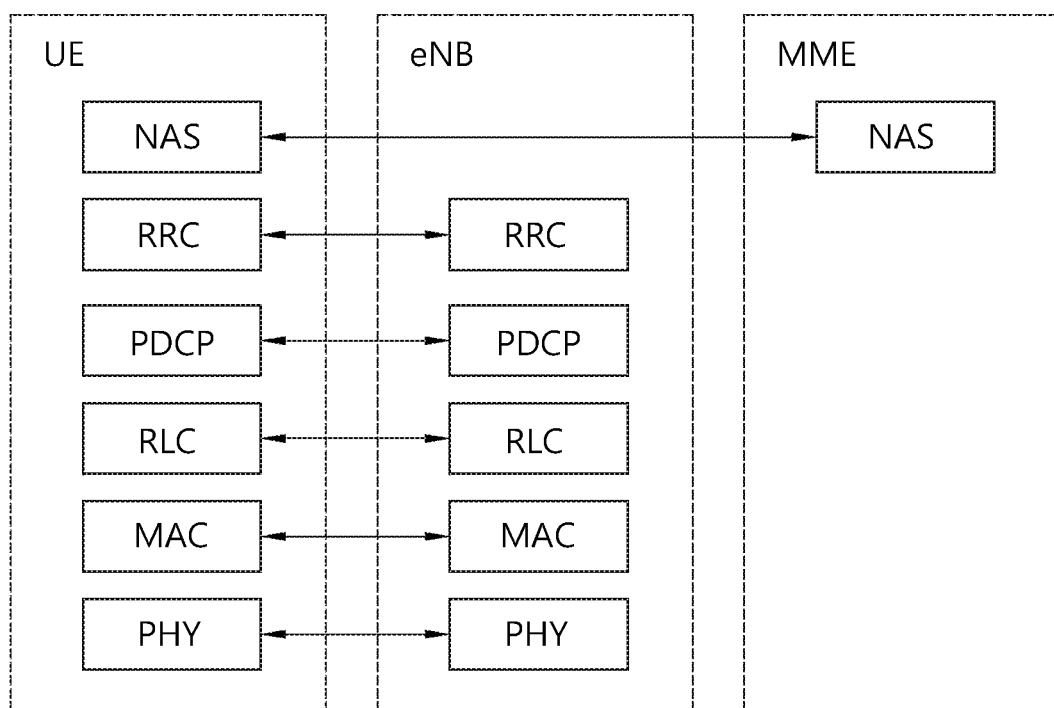
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
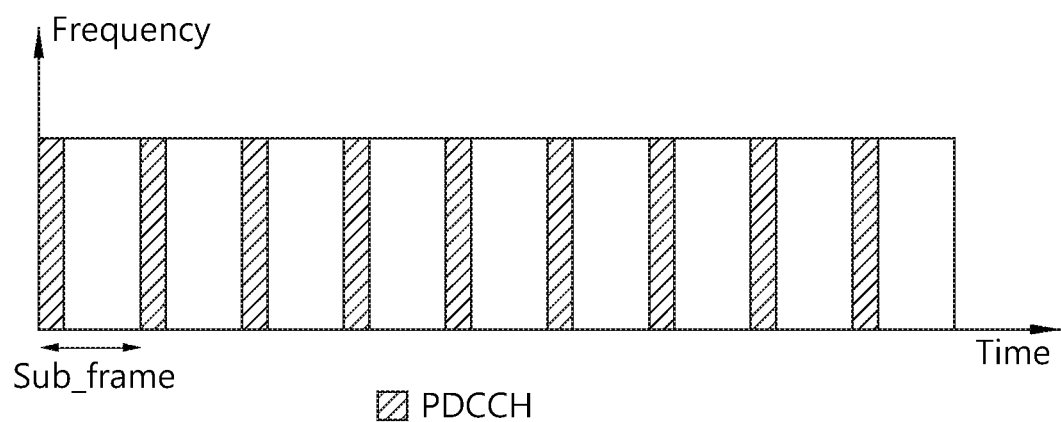
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013-12). The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
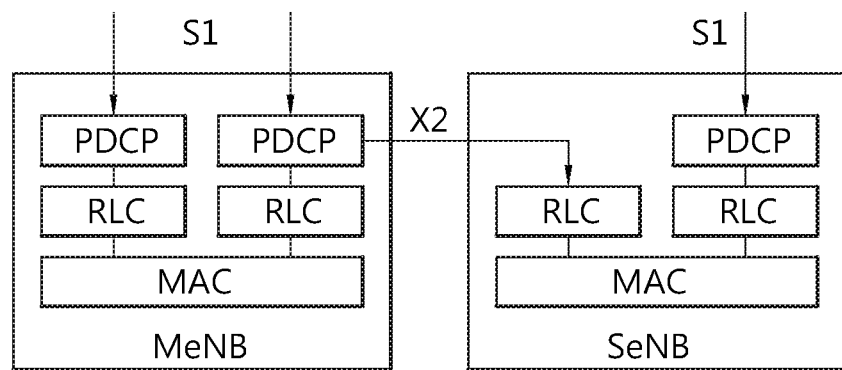
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
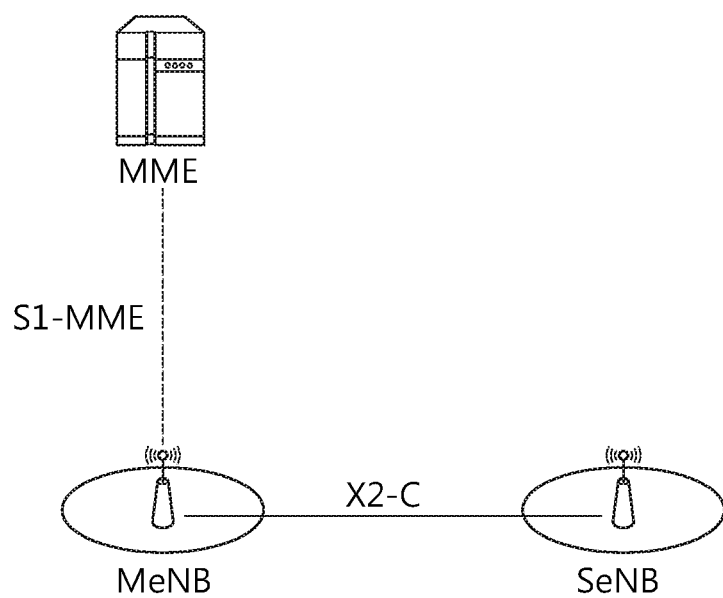
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
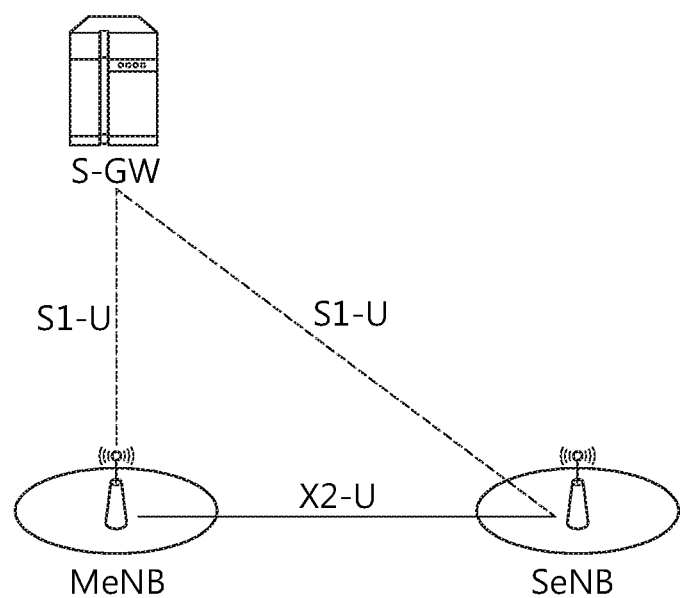
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
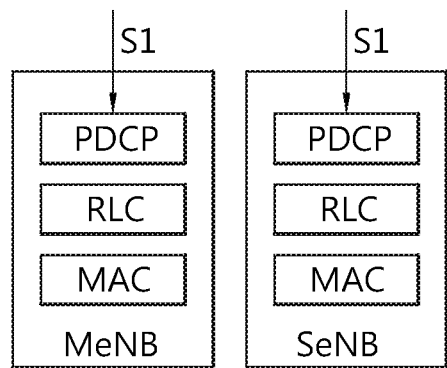
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split).

Figure 10:
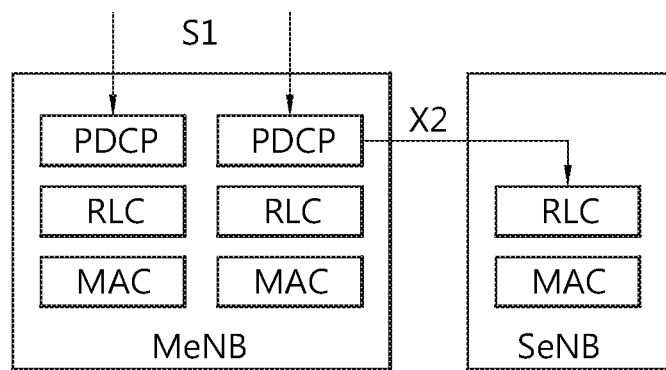
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers.

The corresponding UE architecture may be also changed to support the new feature.

Selected IP traffic offload (SIPTO) at the local network (SIPTO@LN) is described. The SIPTO@LN function enables an IP capable UE connected via a (H)eNB to access a defined IP network (e.g. the Internet) without the user plane traversing the mobile operator's network. The subscription data in the home subscriber server (HSS) are configured per user and per access point name (APN) to indicate to the MME if offload at the local network is allowed or not. SIPTO@LN can be achieved by selecting a L-GW function collocated with the (H)eNB or selecting stand-alone GWs (with S-GW and L-GW collocated) residing in the local network. In both cases the selected IP traffic is offloaded via the local network. If the MME detects a change in SIPTO permissions in the subscription data for a given subscriber for a given APN and the subscriber has already established a SIPTO@LN PDN connection to that APN, the MME shall release the SIPTO@LN PDN connection for that APN with "reactivation requested" cause.

SIPTO@LN is supported using a stand-alone GW (with co-located S-GW and L-GW) deployed in the local network. The MME may decide to trigger S-GW relocation without UE mobility. Mobility for the SIPTO @ LN PDN connection may not be supported. The SIPTO@LN PDN connection shall be released after handover, unless the source and target eNBs are in the same LHN (i.e. they have the same LHN ID).

In case of SIPTO@LN support with stand-alone gateway, the eNB supports the following additional functions:
  signaling of its LHN ID to the MME in the INITIAL UE MESSAGE, UPLINK NAS TRANSPORT, HANDOVER NOTIFY and PATH SWITCH REQUEST messages;
  support for MME-triggered S-GW relocation without UE mobility through the E-RAB MODIFY REQUEST message.

In case of SIPTO@LN support with stand-alone gateway, the MME supports the following additional functions:
  SIPTO@LN PDN activation for the requested APN based on subscription data and received LHN ID;
  1S-GW relocation without UE mobility.

Figure 11:
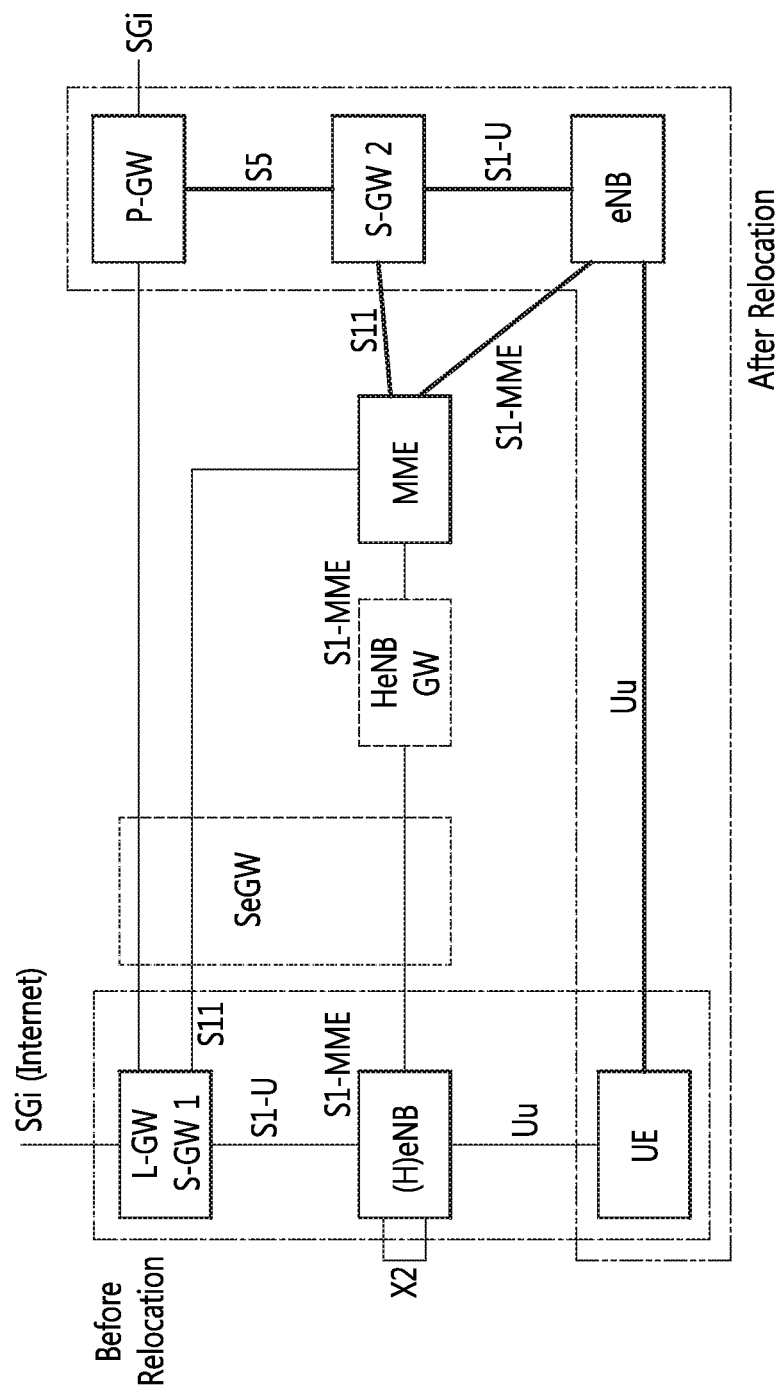
FIG. 11 shows architecture for SIPTO@LN with a stand-alone L-GW.

FIG. 11 shows architecture for SIPTO@LN with a stand-alone L-GW. Referring to FIG. 11, before S-GW relocation, the UE is connected to the (H)eNB via Uu interface, the (H)eNB is connected to the S-GW 1 via S1-U interface, and the S-GW 1 and L-GW are collocated. The L-GW is connected to the Internet directly. Thereafter, it is assumed that S-GW relocation from the local network to the macro network is performed. After S-GW relocation, the UE is connected to the eNB via Uu interface, the eNB is connected to the S-GW 2 via S1-U interface, and the S-GW 2 is connected to the P-GW via S5 interface. The P-GW is connected to the Internet. For this scenario, the location of the S-GW may be determined based on the operator policy and/or user's profile regarding support of SIPTO@LN.

When dual connectivity is introduced in the SIPTO@LN with the standalone L-GW, which means a SeNB exists in the architecture described in FIG. 11, several problems may happen. First, a problem regarding SeNB mobility support in SIPTO@LN is described.

Figure 12:
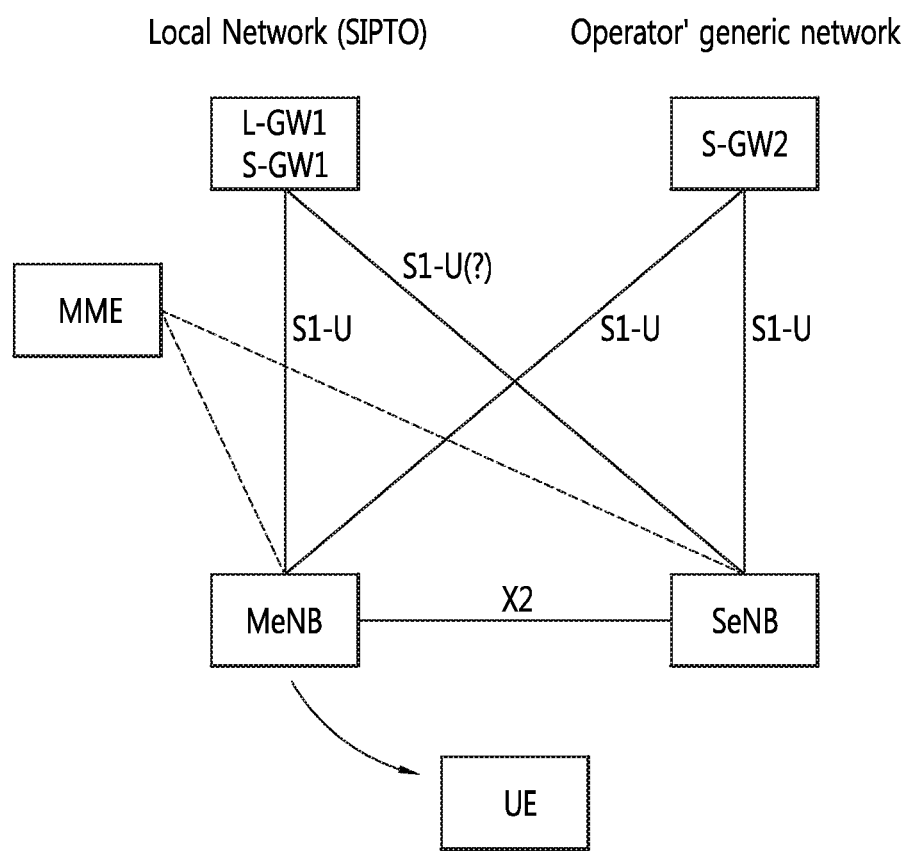
FIG. 12 shows an example of a stand-alone SIPTO@LN with support of dual connectivity.

FIG. 12 shows an example of a stand-alone SIPTO@LN with support of dual connectivity. Referring to FIG. 12, the L-GW 1 corresponds to SIPTO, and is collocated with the S-GW 1. The S-GW 2 corresponds to the operator's generic network. The MeNB is connected to both the S-GW 1 and S-GW 2 via S1-U interface. The UE is currently served by the MeNB. Then it is assumed that the SeNB is to be added by dual connectivity. Since the S-GW 2 corresponds to the operator's generic network, the MeNB can know that the SeNB is connected to the S-GW 2 via S1-U interface. However, the MeNB cannot know whether or not the SeNB is connected to the S-GW 1 which is collocated with the L-GW. That is, regarding SeNB mobility support in SIPTO@LN, the MeNB has no information to decide whether SeNB mobility can be triggered or not in the current mechanism. In addition, if the MeNB tries the SeNB addition procedure without assistant information, the core network has to make a decision whether keeping the connection or deactivating it. However, the MME cannot make that decision based on the current mechanism.

In order to solve the problem described above, a method for transmitting a LHN ID according to an embodiment of the present invention is proposed. According to an embodiment of the present invention, the way how the MeNB knows the LHN ID of the SeNB or indication of L-GW support may be provided. According to this embodiment, by a cell-specific procedure, the MeNB/SeNB may get the LHN ID of each other and/or indication of L-GW support during X2 setup procedure, i.e. through the X2 Setup Request or X2 Response message.

If the MeNB initiates the X2 setup request, the MeNB may transmit the X2 Setup Request message, which includes its L-GW support indication and/or LHN ID of the MeNB, to the SeNB. The X2 Setup Request message may further include the request for feeding back LHN ID of the SeNB if supported. The SeNB may give a reply with X2 Setup Response message, which includes its L-GW support indication and/or the LHN ID of the SeNB, to the MeNB. If the SeNB initiates the X2 setup request, the SeNB may transmit the X2 Setup Request message, which includes its L-GW support indication and/or LHN ID of the SeNB, to the MeNB. The MeNB may give a reply with X2 Setup Response message, which includes its L-GW support indication and/or the LHN ID of the MeNB, to the SeNB.

Table 1 shows an example of the X2 Setup Request message according to an embodiment of the present invention. Table 2 shows an example of the X2 Setup Response message according to an embodiment of the present invention.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >Neighbour Information | | 0 ... <maxnoofNeighbours> | | | — | — |
| >>ECGI | M | | ECGI 9.2.14 | E-UTRAN Cell Global Identifier of the neighbour cell | — | — |

TABLE 1-continued

| IE/Group Name | Presence | Range | IE type and reference | Semantics description | Criticality | Assigned Criticality |
|---|---|---|---|---|---|---|
| >>PCI | M | | INTEGER (0 . . . 503, . . . ) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| GU Group Id List | | 0 . . . <maxfPools> | | List of all the pools to which the eNB belongs | GLOBAL | reject |
| >GU Group Id | M | | 9.2.20 | | — | — |
| LHN ID | O | | 9.2.x | | YES | ignore |

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 . . . <maxCellineNB> | | Complete list of cells served by the eNB | GLOBAL | reject |
| >Served Cell Information | M | | 9.2.8 | | — | — |
| >Neighbour Information | | 0 . . . <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 . . . 503, . . . ) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN | YES | reject |

TABLE 2-continued

| IE/Group Name | Presence | Range | IE type and reference | Semantics description | Criticality | Assigned Criticality |
|---|---|---|---|---|---|---|
| GU Group Id List | | 0 . . . <maxPools> | | for FDD or EARFCN for TDD. If this IE is present, the value signalled in the EARFCN IE is ignored. List of all the pools to which the eNB belongs | GLOBAL | reject |
| >GU Group Id | M | | 9.2.20 | | — | — |
| Criticality Diagnostics | O | | 9.2.7 | | YES | ignore |
| LHN ID | O | | 9.2.x | | YES | ignore |

Referring to Table 1 and Table 2, the X2 Setup Request message and the X2 Setup Response message includes the LHN ID information element (IE). When the MeNB transmits the X2 Setup Request message, the LHN ID IE included in the X2 Setup Request message may correspond to the LHN ID of the MeNB. When the SeNB transmits the X2 Setup Response message, the LHN ID IE included in the X2 Setup Response message may correspond to the LHN ID of the SeNB. Table 3 shows the LHN ID IE which may be included in the X2 Setup Request message or X2 Setup Response message.

TABLE 3

| IE/Group Name | Presence | Range | IE Type and Reference | Semantics Description |
|---|---|---|---|---|
| Local Home Network ID | M | | OCTET STRING (SIZE (32 . . . 256)) | Identifies the Local Home Network. |

According to this embodiment, the initiating eNB 1 may include the LHN ID IE in the X2 Setup Request message. The candidate eNB 2 may also include LHN ID IE in the X2 Setup Response message. Therefore, the MeNB can know whether the LHN ID of the SeNB is the same or not as the LHN ID of the MeNB. Thus, it may be helpful for the MeNB to make decision on whether to trigger SeNB addition procedure or not. If the LHN ID of the SeNB is the same as the LHN ID of the MeNB, the SeNB addition procedure may be successful. Otherwise, it may fail.

Figure 13:
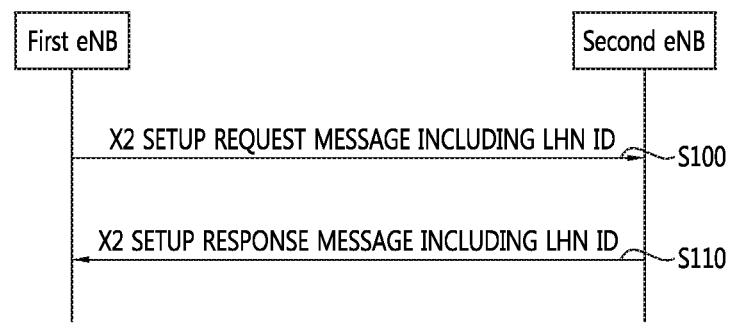
FIG. 13 shows a method for transmitting a LHN ID according to an embodiment of the present invention.

FIG. 13 shows a method for transmitting a LHN ID according to an embodiment of the present invention. In this embodiment, a first eNB may be a MeNB in dual connectivity, and the second eNB may be a SeNB in dual connectivity. Or, the first eNB may be a SeNB in dual connectivity, and the second eNB may be a MeNB in dual connectivity. The first eNB may be connected to a stand-alone L-GW corresponding to a local network. The stand-alone L-GW may be collocated with a first S-GW other than a second S-GW corresponding to an operator's generic network.

In step S100, the first eNB transmits an X2 Setup Request message including a LHN ID of the first eNB to a second eNB. The X2 Setup Request message may follow Table 1 and Table 3 described above. In step S110, the first eNB receives an X2 Setup Response message including a LHN ID of the second eNB from the second eNB. The X2 Setup Response message may follow Table 2 and Table 3 described above. The LHN ID of the first eNB may identify a local home network to which the first eNB belongs. The LHN ID of the second eNB may identify a local home network to which the second eNB belongs. The LHN ID of the first eNB may be the same as the LHN ID of the second eNB.

Figure 14:
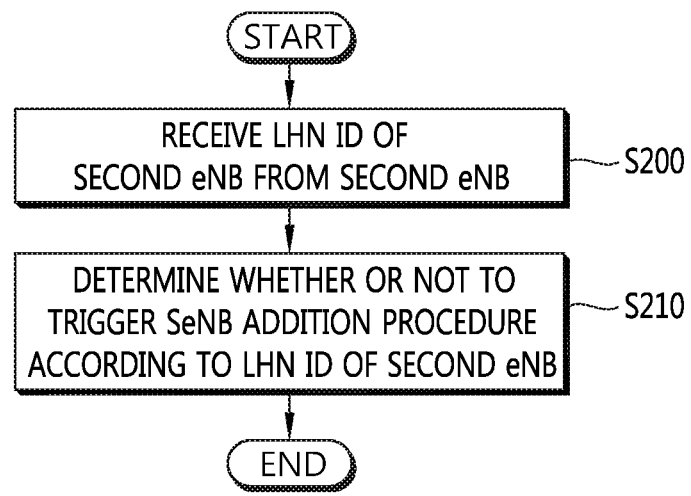
FIG. 14 shows a method for receiving a LHN ID according to an embodiment of the present invention.

FIG. 14 shows a method for receiving a LHN ID according to an embodiment of the present invention. In this embodiment, a first eNB may be a MeNB in dual connectivity, and the second eNB may be a SeNB in dual connectivity. Or, the first eNB may be a SeNB in dual connectivity, and the second eNB may be a MeNB in dual connectivity. The first eNB may be connected to a stand-alone L-GW corresponding to a local network. The stand-alone L-GW may be collocated with a first S-GW other than a second S-GW corresponding to an operator's generic network.

In step S200, the first eNB receives an LHN ID of a second eNB from the second eNB. In step S210, the first eNB determines whether or not to trigger a secondary eNB (SeNB) addition procedure according to the LHN ID of the second eNB. The first eNB may trigger the SeNB addition procedure when it is determined that the LHN ID of the second eNB is the same as a LHN ID of the first eNB. The LHN ID of the second eNB may be received via an X2 Setup Request message or an X2 Setup Response message. The first eNB may transmit a LHN ID of the first eNB to the second eNB. The LHN ID of the first eNB may be transmitted via an X2 Setup Request message or an X2 Setup Response message.

In the description above, the X2 Setup Request/Response messages were used to carry the LHN ID, but other messages may also be used for the same purpose. For example, eNB Configuration Update/Response messages may be used to carry the LHN ID.

According to another embodiment of the present invention, the way how MME/MeNB/SeNB knows the LHN ID of SeNB/MeNB or indication of L-GW support may be provided. This embodiment may correspond to a UE-specific procedure.

Figure 15:
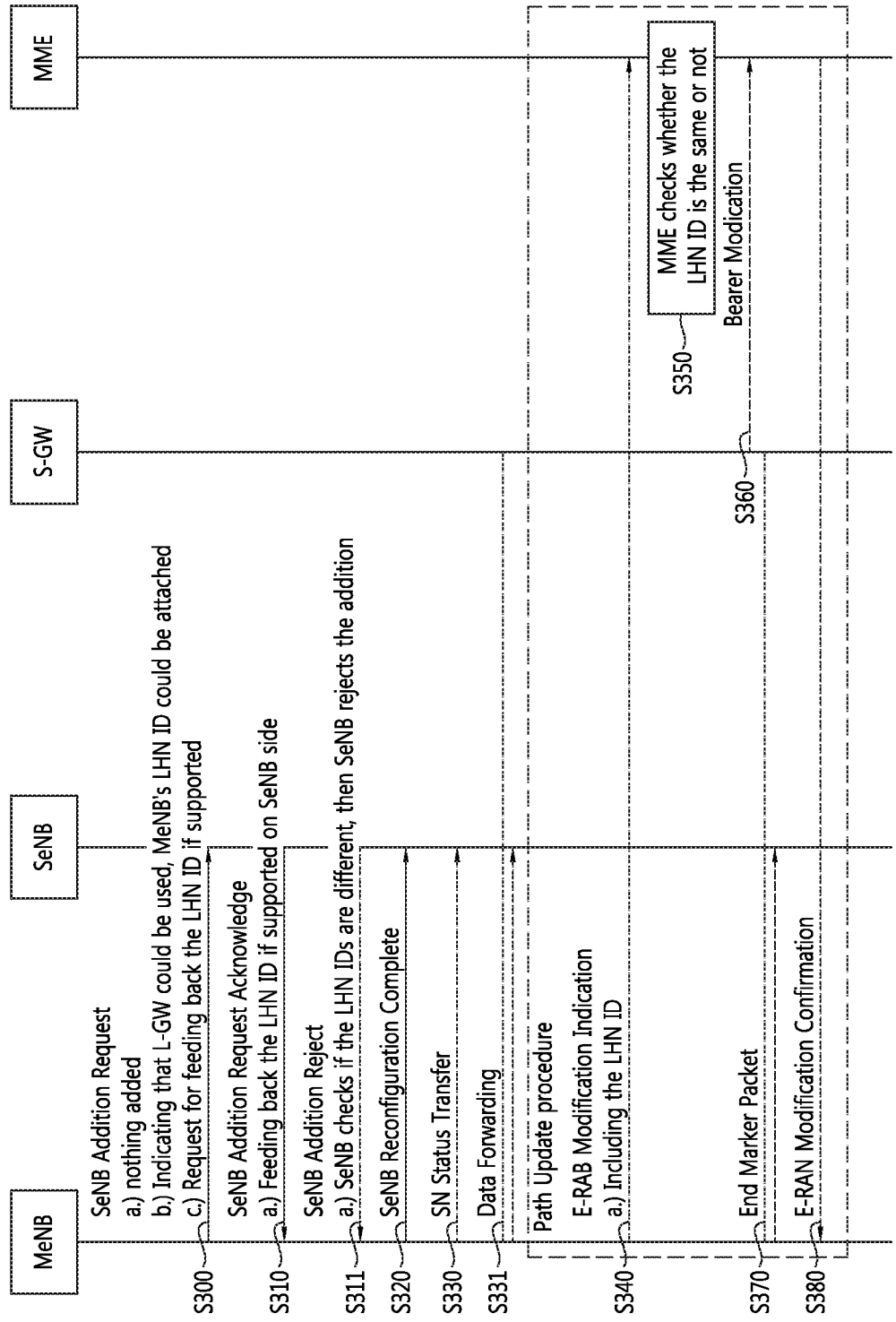
FIG. 15 shows a method for performing a SeNB addition procedure according to an embodiment of the present invention.

FIG. 15 shows a method for performing a SeNB addition procedure according to an embodiment of the present invention.

In step S300, the MeNB decides to request the SeNB to allocate radio resources for a specific E-UTRAN radio access bearer (E-RAB), indicating E-RAB characteristics (E-RAB parameters, transport network layer (TNL) address information corresponding to the UP option). Accordingly, MeNB transmits the SeNB Addition Request message to the SeNB. The SeNB Addition Request message may include at least one of an indication of L-GW support, LHN ID of the MeNB, or a request for feeding back the LHN ID of the SeNB if supported.

Upon receiving the SeNB Addition Request message, the SeNB may check and compare the received LHN ID of the MeNB and LHN ID of the SeNB. In step S310, the SeNB may transmit the SeNB Addition Request Acknowledge message to the MeNB. The SeNB Addition Request Acknowledge message may include the LHN ID of the SeNB. Alternatively, in step S311, the SeNB may transmit the SeNB Addition Reject message to the MeNB. The SeNB Addition Reject message may include a cause indicating that the LHN ID of the MeNB is different from the LHN ID of the SeNB.

In step S320, the MeNB transmit the SeNB Reconfiguration Complete message to the SeNB. In step S330, the sequence number (SN) Status Transfer message may be transmitted. In step S331, data forwarding may be performed.

In step S340, if the LHN ID of the SeNB is received, the MeNB may transmit the E-RAB Modification Indication message to the MME. The E-RAB Modification Indication message may include the LHN ID of the SeNB.

In step S350, the MME may check whether the LHN ID is changed or not for the corresponding E-RAB. If the LHN ID of the SENB is different from the LHN ID of the MeNB, then PDN connection deactivation may be triggered for the corresponding E-RAB.

In step S360, bearer modification may be performed. In step S370, the end marker packet may be transmitted. In step S380, the MME may transmit the E-RAB Modification Confirmation message, in which the E-RABs failed list and/or the E-RABs modified list may be included.

Second, a problem regarding MME triggered S-GW relocation procedure in SIPTO@LN is described. The MME triggered S-GW relocation procedure allows the MME to trigger S-GW relocation due to events other than mobility scenarios. Such scenario exists during the establishment of a SIPTO@LN PDN connection with stand-alone GW or during the establishment of a SIPTO above RAN PDN connection. It is possible that the macro S-GW is allocated for a non-offload PDN connection in the operator network. If a new offload PDN connection is requested, the S-GW relocation procedure from the S-GW controlled by the generic operator to the local S-GW has to be performed, which is based on the 3GPP principles that a single S-GW is used per UE. In this case, the MME triggered S-GW relocation procedure may be performed as the UE establishes or releases a PDN connection that is subject to SIPTO@LN.

Figure 16:
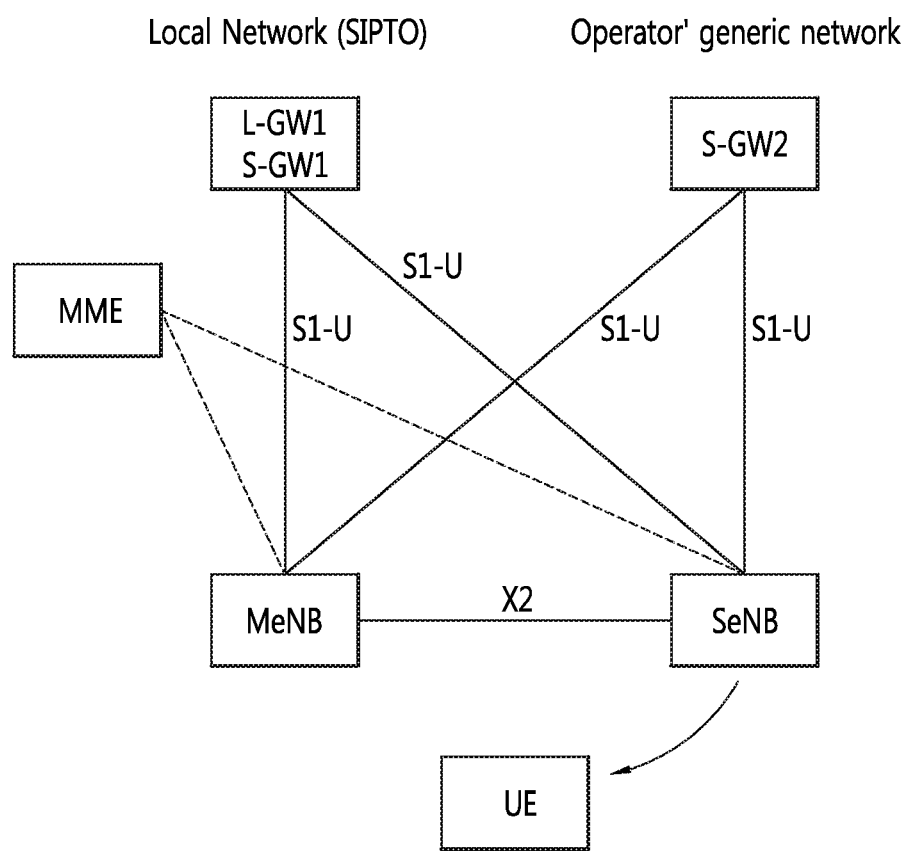
FIG. 16 shows another example of a stand-alone SIPTO@LN with support of dual connectivity.

FIG. 16 shows another example of a stand-alone SIPTO@LN with support of dual connectivity. Referring to FIG. 16, the L-GW 1 corresponds to SIPTO, and is collocated with the S-GW 1. The S-GW 2 corresponds to the operator's generic network. The MeNB is connected to both the S-GW 1 and S-GW 2 via S1-U interface. The SeNB is also connected to both the S-GW 1 and S-GW 2 via S1-U interface. It is assumed that the UE receiving dual connectivity service from the SeNB currently has a new service request by using the L-GW. Thus, the S-GW relocation procedure has to be performed for the existing dual connectivity service.

Figure 17:
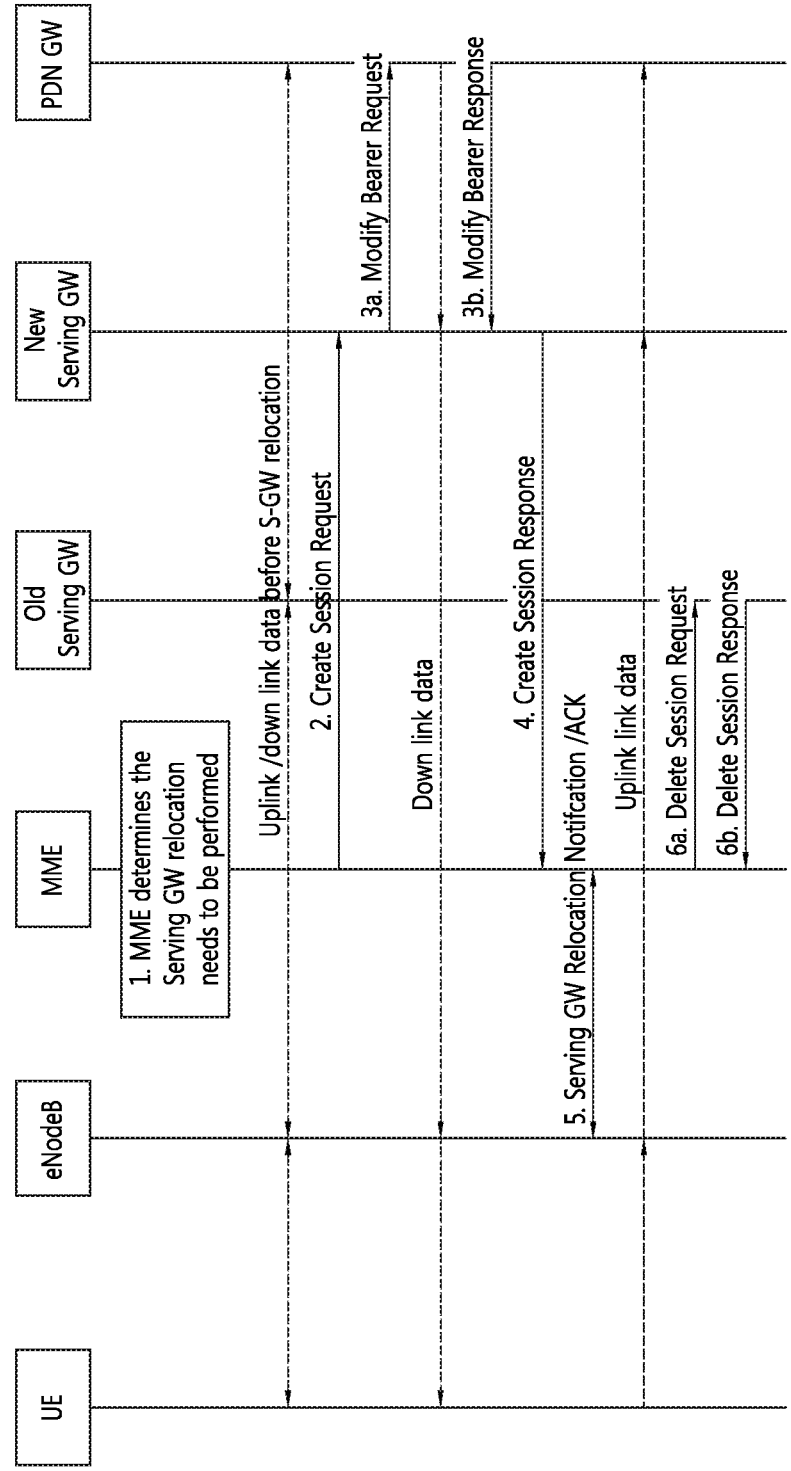
FIG. 17 shows a current MME triggered S-GW relocation procedure.

FIG. 17 shows a current MME triggered S-GW relocation procedure.

1. The S-GW relocation procedure may be triggered by the MME due to events that may benefit from a Serving GW relocation other than mobility events scenarios.

2. If the MME determines that the S-GW is to be relocated then it selects a new S-GW. The MME sends a Create Session Request message per PDN connection to the new S-GW. The new S-GW allocates the S-GW addresses and tunnel endpoint IDs (TEIDs) for the uplink traffic on S1_U reference point (one TEID per bearer). The Protocol Type over S5/S8 is provided to S-GW which protocol should be used over S5/S8 interface. If the PDN GW requested UE's location info, the MME also includes the User Location Information IE in this message. If the P-GW requested UE's User closed subscriber group (CSG) information (determined from the UE context), the MME includes the User CSG Information IE in this message if the User CSG Information has changed.

3. The new S-GW assigns addresses and TEIDs (one per bearer) for downlink traffic from the P-GW. The S-GW allocates DL TEIDs on S5/S8. It sends a Modify Bearer Request message per PDN connection to the P-GW(s). The S-GW also includes User Location Information IE and/or UE Time Zone IE and/or User CSG Information IE if it is present in step 2. The P-GW updates its context field and returns a Modify Bearer Response message to the S-GW. The mobile station international subscriber directory number (MSISDN) is included if the P-GW has it stored in its UE context. The P-GW starts sending downlink packets to the new GW using the newly received address and TEIDs. These downlink packets will use the new downlink path via the new S-GW to the eNB. This step is performed for all connected P-GWs for that specific UE.

4. The new S-GW sends a Create Session Response message back to the MME. The MME starts a timer, to be used in step 6.

5. The MME sends the S-GW Relocation Notification message to eNB. The eNB starts using the new S-GW address(es) and TEID(s) for forwarding subsequent uplink packets.

6. When the timer has expired after step 4, the MME releases the bearer(s) in the old S-GW by sending a Delete Session Request message. The operation Indication flag is not set, that indicates to the old S-GW that the old S-GW shall not initiate a delete procedure towards the P-GW. The old S-GW acknowledges with Delete Session Response messages.

For the stand-alone SIPTO@LN with support of dual connectivity described in FIG. 16, the current MME triggered S-GW relocation procedure described in FIG. 17 may be not enough. Some signaling between the MeNB and SeNB may be further defined to support S-GW relocation.

In order to solve the problem described above, a method for transmitting a message including transport information according to an embodiment of the present invention is proposed.

Figure 18:
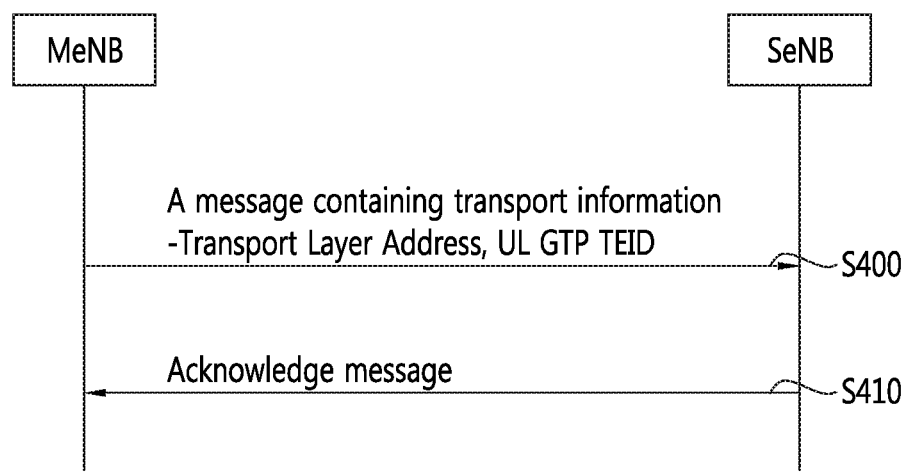
FIG. 18 shows a method for transmitting a message including transport information according to an embodiment of the present invention.

FIG. 18 shows a method for transmitting a message including transport information according to an embodiment of the present invention.

In step S400, the MeNB transmits a message containing transport information to the SeNB. The message may include at least one of a transport layer address or UL GTP TEID. The message containing the transport information may be a newly defined message or the existing message like the SeNB Modification Request message. If the SeNB Modification Request message is used, a new IE in the SeNB Modification Request message may contain the updated transport layer address and UL GTP TEID. Or, the existing S1 UL GTP Tunnel Endpoint IE in the SeNB Modification Request message may contain the updated transport layer address and UL GTP TEID. Further, an indication or cause value for telling the SeNB the modification reason and/or reminding the SeNB of ignoring other mandatory IEs such as E-RAB Level QoS Parameters may be needed. In this case, the indication may indicate L-GW to be applied. The new cause value may indicate L-GW relocation or S-GW relocation. Table 4 shows an example of the SeNB Modification Request message according to an embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| Cause | M | | 9.2.6 | | YES | ignore |
| SCG Change Indication | O | | 9.2.73 | | YES | ignore |
| Serving PLMN | O | | PLMN Identity 9.2.4 | The serving PLMN of the SCG in the SeNB. | YES | ignore |
| UE Context Information | | 0 . . . 1 | | | YES | reject |
| >UE Security Capabilities | O | | 9.2.29 | | — | — |
| >SeNB Security Key | O | | 9.2.72 | | — | — |
| >SeNB UE Aggregate Maximum Bit Rate | O | | UE Aggregate Maximum Bit Rate 9.2.12 | | — | — |
| >E-RABs To Be Added List | | 0 . . . 1 | | | — | — |
| >>E-RABs To Be Added Item | | 1 . . . <maxnoofBearers> | | | EACH | ignore |
| >>>CHOICE Bearer Option | M | | | | — | — |
| >>>>SCG Bearer | | | | | | |
| >>>>>E-RAB ID | M | | 9.2.23 | | — | — |
| >>>>>E-RAB Level QoS Parameters | M | | 9.2.9 | Includes necessary QoS parameters | — | — |
| >>>>>DL Forwarding | O | | 9.2.5 | | — | — |
| >>>>>S1 UL GTP Tunnel Endpoint | M | | GTP Tunnel Endpoint 9.2.1 | SGW endpoint of the S1 transport bearer. For delivery of UL PDUs. | — | — |
| >>>>>Transport Information | O | | | | EACH | reject |
| >>>>>>Transport Layer Address | M | | | | — | |
| >>>>>>UL GTP TEID | M | | GTP-TEID 9.2.1 | | — | |
| >>>>> L-GW to be applied | O | | | | | |
| >>>>Split Bearer | | | | | | |

TABLE 4-continued

| IE/Group Name | Presence | Range | IE type and reference | Semantics description | Criticality | Assigned Criticality |
|---|---|---|---|---|---|---|
| >>>>>E-RAB ID | M | | 9.2.23 | | — | — |
| >>>>>E-RAB Level QoS Parameters | M | | 9.2.9 | Includes necessary QoS parameters | — | — |
| >>>>>MeNB GTP Tunnel Endpoint | M | | GTP Tunnel Endpoint 9.2.1 | MeNB endpoint of the X2 transport bearer. For delivery of UL PDUs. | — | — |
| >E-RABs To Be Modified List | | 0 . . . 1 | | | — | — |
| >>E-RABs To Be Modified Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | — | — |
| >>>>>E-RAB Level QoS Parameters | O | | 9.2.9 | Includes QoS parameters to be modified | — | — |
| >>>>>S1 UL GTP Tunnel Endpoint | O | | GTP Tunnel Endpoint 9.2.1 | SGW endpoint of the S1 transport bearer. For delivery of UL PDUs. | — | — |
| >>>>Split Bearer | | | | | | |
| >>>>>E-RAB ID | M | | 9.2.23 | | — | — |
| >>>>>E-RAB Level QoS Parameters | O | | 9.2.9 | Includes QoS parameters to be modified | — | — |
| >>>>>MeNB GTP Tunnel Endpoint | O | | GTP Tunnel Endpoint 9.2.1 | MeNB endpoint of the X2 transport bearer. For delivery of UL PDUs. | — | — |
| >E-RABs To Be Released List | | 0 . . . 1 | | | — | — |
| >>E-RABs To Be Released Item | | 1 . . . <maxnoofBearers> | | | EACH | ignore |
| >>>CHOICE Bearer Option | M | | | | | |
| >>>>SCG Bearer | | | | | | |
| >>>>>E-RAB ID | M | | 9.2.23 | | — | — |
| >>>>>DL Forwarding GTP Tunnel Endpoint | O | | GTP Tunnel Endpoint 9.2.1 | Identifies the X2 transport bearer used for forwarding of DL PDUs | — | — |
| >>>>>UL Forwarding GTP Tunnel Endpoint | O | | GTP Tunnel Endpoint 9.2.1 | Identifies the X2 transport bearer. used for forwarding of UL PDUs | — | — |
| >>>>Split Bearer | | | | | | |
| >>>>>E-RAB ID | M | | 9.2.23 | | — | — |
| >>>>>DL | O | | GTP | Identifies the | — | — |

TABLE 4-continued

| IE/Group Name | Presence | Range | IE type and reference | Semantics description | Criticality | Assigned Criticality |
|---|---|---|---|---|---|---|
| Forwarding GTP Tunnel Endpoint | | | Tunnel Endpoint 9.2.1 | X2 transport bearer used for forwarding of DL PDUs | | |
| MeNB to SeNB Container | O | | OCTET STRING | Includes the SCG-ConfigInfo message as defined in TS 36.331 [9] | YES | ignore |

Referring to Table 4, the SeNB Modification Request message includes the Transport Layer Address IE and the UL GTP TEID IE. Further, the SeNB Modification Request message may include the Cause IE and/or L-GW to be applied IE.

Upon receiving the message including the transport information, the SeNB may use the transport information included in the message as the new S-GW address and UL packet destination for the relevant E-RAB. And, the SeNB may ignore the E-RAB Level QoS Parameters for the same E-RAB. In step S410, the SeNB may transmit the acknowledge message to the MeNB.

Figure 19:
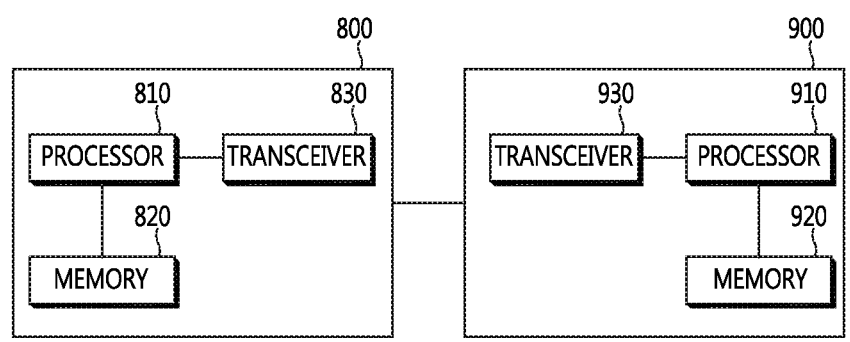
FIG. 19 shows a communication system to implement an embodiment of the present invention.

FIG. 19 shows a communication system to implement an embodiment of the present invention.

A first eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second eNB 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a first evolved NodeB (eNB) in a wireless communication system, the method comprising:

transmitting, by the first eNB to a second eNB, a secondary eNB (SeNB) addition request message including a local home network identity (LHN ID) of the first eNB, wherein the LHN ID of the first eNB identifies a local home network to which the first eNB belongs, and wherein the SeNB addition request message informs that the first eNB is connected to a stand-alone local gateway (L-GW) related to a local network;

receiving, by the first eNB from the second eNB, a response message indicating whether a SeNB addition request is accepted or rejected, wherein the response message indicates the SeNB addition request is accepted when the LHN ID of the first eNB is the same as a LHN ID of the second eNB, wherein the response message indicates the SeNB addition request is rejected when the LHN ID of the first eNB is not the same as the LHN ID of the second eNB, wherein the LHN ID of the first eNB is the same as the LHN ID of the second eNB when the second eNB is connected to the L-GW to which the first eNB is connected, wherein the LHN ID of the second eNB is included in the response message, and wherein the LHN ID of the second eNB identifies a local home network to which the second eNB belongs;

transmitting, by the first eNB to a mobility management entity (MME), an E-UTRAN radio access bearer (E-RAB) modification indication message including the LHN ID of the second eNB, when the response message indicates the SeNB addition request message is accepted;

receiving, by the first eNB from the MME, an E-RAB modification confirmation message including a list of modified E-RABs and a list of failed E-RABs; and keeping, by the first eNB, connection with the second eNB, wherein the first eNB is a master eNB (MeNB) in dual connectivity and the second eNB is a SeNB in dual connectivity, and wherein the stand-alone L-GW is co-located with a serving gateway (S-GW).

2. A first evolved NodeB (eNB) in a wireless communication system, the first eNB comprising:

a memory;

a transceiver; and a processor, operably coupled to the memory and the transceiver, that:

controls the transceiver to transmit, to a second eNB, a secondary eNB (SeNB) addition request message including a local home network identity (LHN ID) of the first eNB, wherein the LHN ID of the first eNB identifies a local home network to which the first eNB belongs, and wherein the SeNB addition request message informs that the first eNB is connected to a stand-alone local gateway (L-GW) related to a local network, controls the transceiver to receive, from the second eNB, a response message indicating whether a SeNB addition request is accepted or rejected, wherein the response message indicates the SeNB addition request is accepted when the LHN ID of the first eNB is the same as a LHN ID of the second eNB, wherein the response message indicates the SeNB addition request is rejected when the LHN ID of the first eNB is not the same as the LHN ID of the second eNB, wherein the LHN ID of the first eNB is the same as the LHN ID of the second eNB when the second eNB is connected to the L-GW to which the first eNB is connected, and wherein the LHN ID of the second eNB is included in the response message, and wherein the LHN ID of the second eNB identifies a local home network to which the second eNB belongs;

controls the transceiver to transmit, to a mobility management entity (MME), an E-UTRAN radio access bearer (E-RAB) modification indication message including the LHN ID of the second eNB, when the response message indicates the SeNB addition request message is accepted;

controls the transceiver to receive, from the MME, an E-RAB modification confirmation message including a list of modified E-RABs and a list of failed E-RABs; and keep connection with the second eNB, wherein the first eNB is a master eNB (MeNB) in dual connectivity and the second eNB is a SeNB in dual connectivity, and wherein the stand-alone L-GW is co-located with a serving gateway (S-GW).

* * * * *